United States Patent
Wegner et al.

(10) Patent No.: US 12,283,114 B2
(45) Date of Patent: Apr. 22, 2025

(54) VEHICLE LANE BOUNDARY DETECTION

(71) Applicant: Ford Global Technologies, LLC, Dearborn, MI (US)

(72) Inventors: Christian Wegner, Grosse Ile, MI (US); Mahmoud Yousef Ghannam, Canton, MI (US); Bradford Scott Bondy, St. Clair Shores, MI (US); Muhannad Hamdan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 18/147,031

(22) Filed: Dec. 28, 2022

(65) Prior Publication Data

US 2024/0221391 A1  Jul. 4, 2024

(51) Int. Cl.
*G06V 20/56* (2022.01)
*G01C 21/34* (2006.01)
*G06V 20/58* (2022.01)

(52) U.S. Cl.
CPC .......... *G06V 20/588* (2022.01); *G01C 21/34* (2013.01); *G06V 20/584* (2022.01)

(58) Field of Classification Search
CPC ..... G06V 20/588; G06V 20/584; G01C 21/34
See application file for complete search history.

(56) References Cited

U.S. PATENT DOCUMENTS

| | | | |
|---|---|---|---|
| 10,762,358 B2 | 9/2020 | Myers et al. | |
| 10,997,433 B2 | 5/2021 | Xu et al. | |
| 2013/0211720 A1* | 8/2013 | Niemz | B62D 15/025 701/538 |
| 2019/0266418 A1* | 8/2019 | Xu | G06V 10/457 |
| 2020/0064855 A1* | 2/2020 | Ji | G05D 1/0246 |
| 2020/0193177 A1 | 6/2020 | Kozonek et al. | |
| 2020/0218909 A1* | 7/2020 | Myeong | G06V 20/588 |
| 2021/0248392 A1* | 8/2021 | Zaheer | G06N 3/08 |

(Continued)

FOREIGN PATENT DOCUMENTS

| | | |
|---|---|---|
| CN | 112888613 A | 6/2021 |
| WO | 2017065627 A1 | 9/2017 |
| WO | 2018117538 A1 | 6/2018 |

OTHER PUBLICATIONS

"Robust Lane Detection form Continuous Driving Scenes Using Deep Neural Networks" Qin Zou et al., IEEE Transactions on Vehicular Technology vol. 69 No. Jan. 1, 2020 (Year: 2020).*

(Continued)

*Primary Examiner* — Shardul D Patel
*Assistant Examiner* — Tanya C Sienko
(74) *Attorney, Agent, or Firm* — Frank Lollo; Brooks Kushman P.C.

(57) ABSTRACT

A system for determining lane information. A memory storing instructions executable by a processor includes instructions to receive forward image data of a roadway from a forward-facing camera of a vehicle, determine visible lane boundaries of the driving lane based on lane marking features in the forward image data, determine a predicted lane boundary of the driving lane based, at least in part, on forward features in the forward image data, and determine a driving path of the vehicle through the visible lane boundaries and the predicted lane boundary.

20 Claims, 7 Drawing Sheets

(56) References Cited

U.S. PATENT DOCUMENTS

| | | | | |
|---|---|---|---|---|
| 2023/0106961 A1* | 4/2023 | Hassan | ................ | G06N 3/0464 |
| | | | | 348/135 |
| 2023/0298361 A1* | 9/2023 | Yang | .................... | G06V 20/588 |
| | | | | 382/104 |
| 2023/0298362 A1* | 9/2023 | Zhang | ....................... | G06T 7/60 |
| | | | | 382/103 |

OTHER PUBLICATIONS

"Advances in Vision-Based Lane Detection: Algorithms, Integration, Assessment, and Perspectives on ACP-Based Parallel Vision" Y. Xing et al., IEEE/CAA Journal of Automatical Sinica, vol. 5 No. 3, May 2018 (Year: 2018).*

"Tire track identification: Application of U-net deep learning model for drivable region detection in snow occluded conditions" by P. Kadav et al., 28th ITS World Congress, Los Angeles, Sep. 18-22, 2022 (Year: 2022).*

Haqu, R. et al., "A Computer Vision based Lane Detection Approach," I.J. Image, Graphics and Signal Processing, Mar. 2019, 8 pages.

* cited by examiner

VEHICLE LANE BOUNDARY DETECTION

BACKGROUND

Vehicles that can operate at different autonomous or semi-autonomous modes may include systems such as adaptive cruise control, which can control speed of a vehicle, including by adapting the speed of the vehicle to one or more other vehicles; lane-centering, in which vehicle steering is controlled to maintain a lateral position of a vehicle in the center of a lane of travel; and lane-changing, in which a vehicle steering, acceleration, and/or braking can be controlled to move a vehicle from one lane of travel to another. Such systems may be referred to as Advanced Driver Assistance Systems (ADAS). In some examples, an ADAS system can provide an indication of lane deviation, hands-free driving, and can control steering not only to maintain a vehicle in a lane of a roadway, but to change lanes.

DETAILED DESCRIPTION

Real-world environment conditions can negatively affect the performance of advanced driver assistance system (ADAS) features. Elements covering the road, such as rain, dirt, sand, fog, snow, etc., can make lane detection more difficult. The present description disclosed systems and methods for determining lane boundary information. A lane boundary may be predicted using machine learning models when image data does not contain sufficient lane marking features to determine the lane boundary. The machine learning models may use non-lane marking features, such as lane widths, track edges, tire edges, taillight edges, etc. to predict lane boundaries. Image data from a rearward-facing camera may be used to confirm a predicted lane boundary and update the machine learning models based on the location accuracy of the predicted lane boundary.

Throughout the description reference is made to FIGS. 1-5C. When referring to the figures, like structures and elements shown throughout are indicated with like reference numerals.

In one exemplary configuration, a system for determining lane information of a roadway is disclosed. The roadway includes a driving lane for a vehicle. The system includes a processor and a memory storing instructions executable by the processor. The instructions cause the processor to receive forward image data of the roadway from a forward-facing camera of the vehicle.

A determining instruction determines visible lane boundaries of the driving lane based on lane marking features in the forward image data. The forward image data include sufficient lane marking features to determine the visible lane boundaries. The instructions may include instructions to receive LIDAR data from a LIDAR sensor of the vehicle, and the visible lane boundaries may be based on, at least in part, the LIDAR data.

Another determining instruction determines a predicted lane boundary of the driving lane based, at least in part, on forward features in the forward image data. The forward image data include insufficient lane marking features to determine the predicted lane boundary. In one configuration, the forward features include a lane width of the driving lane. The instructions may include instructions to detect lane marking edges from the lane markings in the forward image data, and the forward features may include the lane marking edges. The instructions may include instructions to detect track edges of vehicle tracks in the forward image data, and the forward features may include the track edges. The instructions may include instructions to detect tire edges of vehicle tires in the forward image data, and the forward features may include the tire edges. The instructions may include instructions to detect taillight edges of vehicle taillights in the forward image data, and the forward features may include the taillight edges.

In one configuration, the predicted lane boundary may be located forward of the visible lane boundaries on the roadway, and the instructions to determine the predicted lane boundary may include instructions to determine the predicted lane boundary by a forward predicting model. The instructions may cause the processor to receive rearward image data of the roadway, determine a location accuracy of the predicted lane boundary based on rearward features from, at least in part, the rearward image data, and update the forward predicting model based on the location accuracy of the predicted lane boundary.

In one configuration, the predicted lane boundary may be located between the visible lane boundaries on the roadway, and the instructions to determine the predicted lane boundary may include instructions to determine the predicted lane boundary by an in-between predicting model. The instructions may cause the processor to receive rearward image data of the roadway, determine a location accuracy of the predicted lane boundary based on rearward features from, at least in part, the rearward image data, and update the in-between predicting model based on the location accuracy of the predicted lane boundary.

The instructions may include instructions to determine a driving path of the vehicle through the visible lane boundaries and the predicted lane boundary. The instructions may include instructions to determine a lane deviation of the vehicle when a position of the vehicle in the roadway departs from the driving path and to provide an indication of lane deviation when the position of the vehicle in the roadway departs from the driving path. In one configuration, the instructions include instructions to actuate the vehicle based on the driving path.

Another exemplary configuration is a method for determining lane information. The method includes a receiving forward image data of a roadway from a forward-facing camera of a vehicle. The roadway includes a driving lane for the vehicle. A determining step determines visible lane boundaries of the driving lane based on lane marking features in the forward image data. The forward image data include sufficient lane marking features to determine the visible lane boundaries.

A determining step determines a predicted lane boundary of the driving lane based, at least in part, on forward features in the forward image data. The forward image data include insufficient lane marking features to determine the predicted lane boundary. In one configuration, a detecting step detects track edges of vehicle tracks in the forward image data, and the forward features include the track edges.

The predicted lane boundary may be located forward of the visible lane boundaries on the roadway and determining the predicted lane boundary may include determining the predicted lane boundary by a forward predicting model. In one configuration, a receiving step receives rearward image data of the roadway, and a determining step determines a location accuracy of the predicted lane boundary based on rearward features from, at least in part, the rearward image data. The forward predicting model may be updated based on the location accuracy of the predicted lane boundary.

The predicted lane boundary may be located between the visible lane boundaries on the roadway and determining the predicted lane boundary may include determining the predicted lane boundary by an in-between predicting model. In one configuration, a receiving step receives rearward image data of the roadway, and a determining step determines a location accuracy of the predicted lane boundary based on rearward features from, at least in part, the rearward image data. The in-between predicting model may be updated based on the location accuracy of the predicted lane boundary.

The method may include a determining step to determine a driving path of the vehicle through the visible lane boundaries and the predicted lane boundary.

Another implementation may include a computer program product for determining lane information. The computer program product includes a non-transitory computer readable storage medium having computer readable program code configured to receive forward image data of a roadway from a forward-facing camera of a vehicle, determine visible lane boundaries of the driving lane based on lane marking features in the forward image data, determine a predicted lane boundary of the driving lane based, at least in part, on forward features in the forward image data, and determine a driving path of the vehicle through the visible lane boundaries and the predicted lane boundary. The forward image data include sufficient lane marking features to determine the visible lane boundaries, while the forward image data include insufficient lane marking features to determine the predicted lane boundary.

Figure 1:
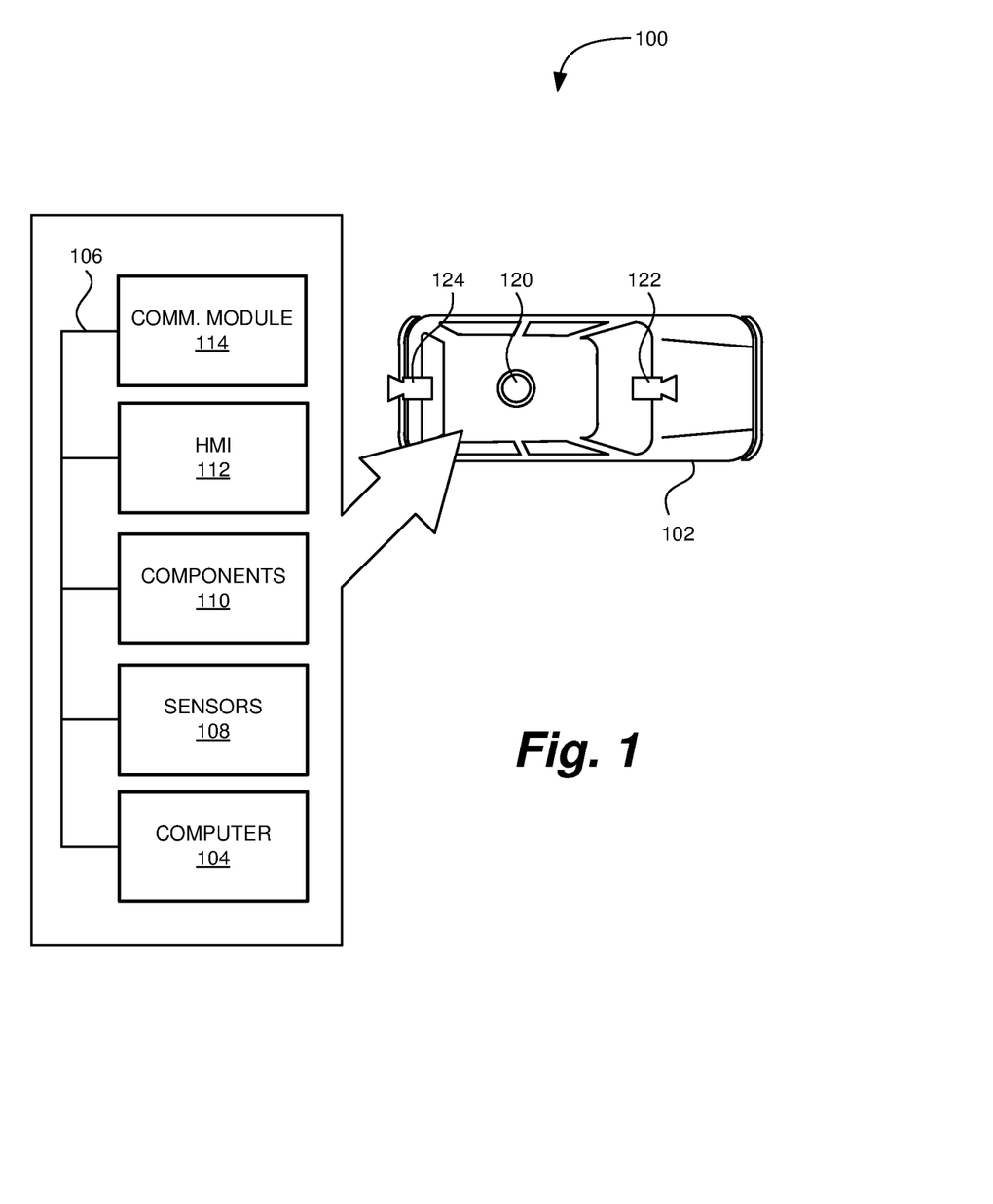
FIG. 1 shows a block diagram of an example vehicle system.

Turning to FIG. 1, a vehicle system 100 includes elements that may be provided, at least partly, to support a vehicle Advanced Driver Assistance Systems (ADAS) including a computer 104 that includes a processor and a memory. The memory includes one or more forms of computer readable media, and stores instructions executable by the vehicle computer 104 for performing various operations, including as disclosed herein.

For example, a vehicle computer 104 can be a generic computer with a processor and memory as described above and/or may include an electronic control unit (ECU) or controller for a specific function or set of functions, and/or a dedicated electronic circuit including an application-specific integrated circuit (ASIC) that is manufactured for a particular operation, e.g., an ASIC for processing sensor data and/or communicating the sensor data.

In another example, a vehicle computer 104 may include a field-programmable gate array (FPGA) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 110 inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers, or any volatile or non-volatile media. The memory can store the collected data sent from the sensors 108. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104.

The computer 104 may include programming to operate one or more of vehicle brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 106 such as a communications bus, more than one processor, e.g., included in components 110 such as sensors 108, electronic control units (ECUs) or the like included in the vehicle 102 for monitoring and/or controlling various vehicle components, e.g., a powertrain controller, a brake controller, a steering controller, etc.

The computer 104 is generally arranged for communications on a vehicle network 106 that can include a communications bus in the vehicle 102 such as a controller area network CAN or the like, and/or other wired and/or wireless mechanisms. The vehicle network 106 is a communications network via which messages can be exchanged between various devices, e.g., sensors 108, components 110, computer 104 (s), etc. in the vehicle 102.

The computer 104 can be generally programmed to send and/or receive, via vehicle network 106, messages to and/or from other devices in vehicle 102, such as, any or all of ECUs, sensors 108, actuators, components 110, communications module, a human machine interface (HMI), etc. For example, various component 110 subsystems (e.g., components 110 can be controlled by respective ECUs) and/or sensors 108 may provide data to the computer 104 via the vehicle communication network 106.

In cases in which the computer 104 actually comprises a plurality of devices, the vehicle network 106 may be used for communications between devices represented as computer 104 in this disclosure. For example, vehicle network 106 can include a controller area network CAN in which messages are conveyed via a CAN bus, or a local interconnect network LIN in which messages are conveyed via a LIN bus. In some implementations, the vehicle network 106 can include a network in which messages are conveyed using other wired communication technologies and/or wireless communication technologies, such as, Ethernet, WiFi, Bluetooth, etc. Additional examples of protocols that may be used for communications over vehicle network 106 in some implementations include, without limitation, Media Oriented System Transport MOST, Time-Triggered Protocol TTP, and FlexRay. In some implementations, the vehicle network 106 can represent a combination of multiple networks, possibly of different types, that support communications among devices in the vehicle 102. For example, the vehicle network 106 can include a CAN in which some devices in the vehicle 102 communicate via a CAN bus, and a wired or wireless local area network in which some device in the vehicle 102 communicate according to Ethernet or Wi-Fi communication protocols.

The vehicle 102 typically includes a variety of sensors 108. A sensor 108 is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system (GPS) sensors 108; accelerometers such as piezo-electric or microelectromechanical systems (MEMS); gyroscopes such as rate, ring laser, or fiber-optic gyroscopes; inertial measurements units (IMU); and magnetometers. Some sensors 108 detect the external world, for example, radar sensors 108, scanning laser range finders, light detection and ranging (LIDAR) devices 120, and image processing sensors such as cameras.

The vehicle 102 may be equipped, for example, with a forward-facing camera 122 and a rearward-facing camera 124. The forward-facing camera 122 is configured to generate forward image data of a roadway. As used herein, a "roadway" includes any suitable travel surface such as shoulder and service lanes of the roadway. The rearward-facing camera 124 is configured to generate rearward image data of the roadway. A LIDAR device 120 detects distances to objects by emitting laser pulses and measuring the time of flight for the pulse to travel to the object and back.

Some sensors 108 are communications devices, for example, vehicle-to-infrastructure (V2I) or vehicle-to-vehicle (V2V) devices. Often, but not necessarily, a sensor 108 includes a digital-to-analog converter to converted sensed analog data to a digital signal that can be provided to a digital computer 104, e.g., via a network.

The sensors 108 can include a variety of devices, and can be disposed to sense an environment, provide data about a machine, etc., in a variety of ways. For example, a sensor 108 could be mounted to a stationary infrastructure element on, over, or near a road. Moreover, various controllers in a vehicle 102 may operate as sensors 108 to provide data via the vehicle network 106 or bus, e.g., data relating to vehicle 102 speed, acceleration, location, subsystem and/or component 110 status, etc.

Other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor data could include data for determining a position of a component 110, a location of an object, a speed of an object, a type of an object, a slope of a roadway, a temperature, a presence or amount of moisture, a fuel level, a data rate, etc.

The computer 104 may include programming to command one or more actuators to operate one or more vehicle 102 subsystems or components 110, such as vehicle brakes, propulsion, or steering. That is, the computer 104 may actuate control of acceleration in the vehicle 102 by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 106, more than one processor, e.g., included in components 110 such as sensors 108, electronic control units (ECUs) or the like for monitoring and/or controlling various vehicle components, e.g., ECUs or the like such as a powertrain controller, a brake controller, a steering controller, etc.

The vehicle 102 can include an HMI 112 (human-machine interface), e.g., one or more of a display, a touchscreen display, a microphone, a speaker, etc. The user can provide input to devices such as the computer 104 via the HMI 112. The HMI 112 can communicate with the computer 104 via the vehicle network 106, e.g., the HMI 112 can send a message including the user input provided via a touchscreen, microphone, a camera that captures a gesture, etc., to a computer 104, and/or can display output, e.g., via a screen, speaker, etc.

The computer 104 may be configured for communicating via a vehicle-to-vehicle (V2V) communication module 114 or interface with devices outside of the vehicle 102, e.g., through a wide area network and/or V2V, vehicle-to-infrastructure or everything (V2X) or vehicle-to-everything including cellular communications (C-V2X) wireless communications cellular, DSRC, etc. to another vehicle 102, to an infrastructure element typically via direct radio frequency communications and/or typically via the network to a remote server. The module could include one or more mechanisms by which the computers 104 of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications DSRC, cellular V2X CV2X, and the like.

Figure 2:
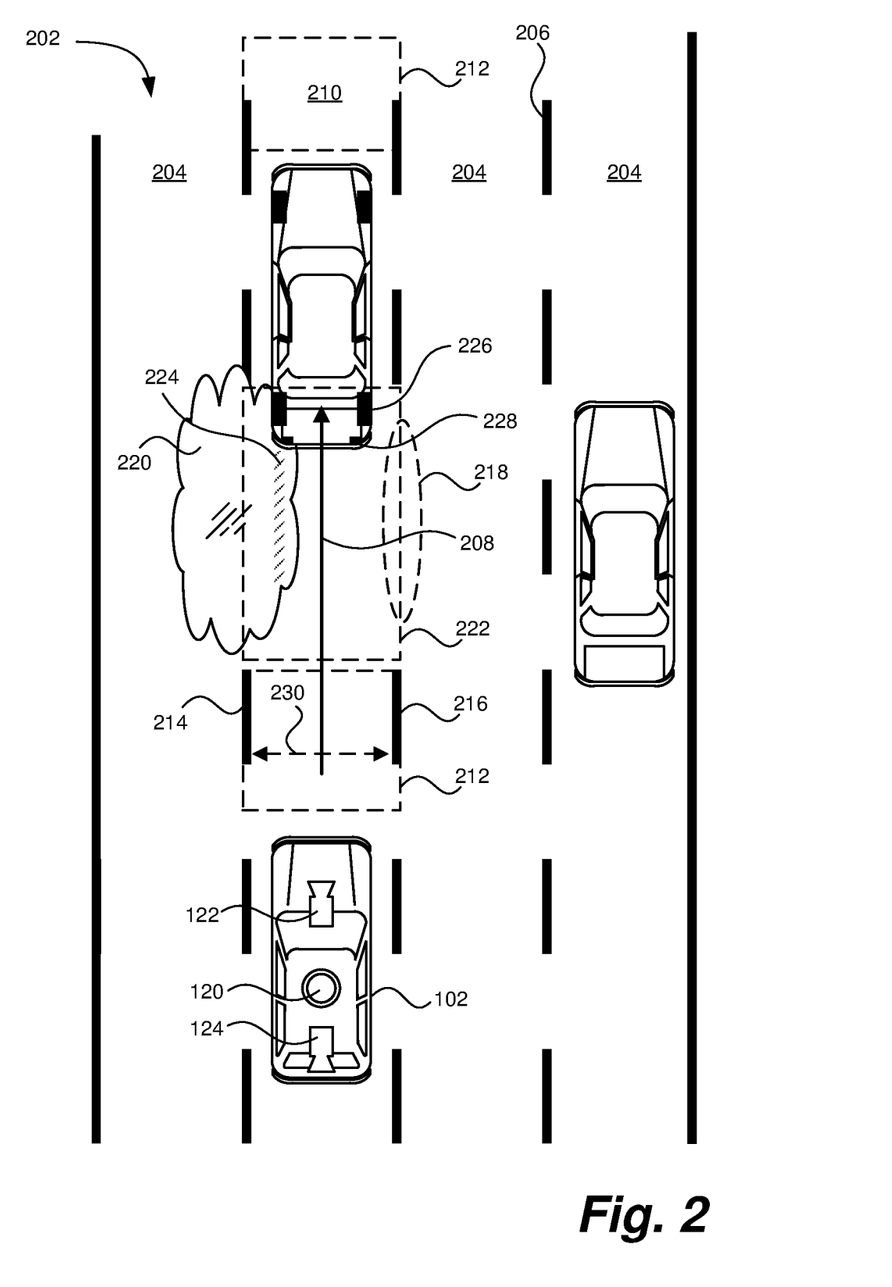
FIG. 2 a schematic diagram of an example traffic scene in which a vehicle is operating on a roadway.

FIG. 2 is a schematic diagram of an example traffic scene in which a vehicle 102 is operating on a roadway 202. The roadway 202 includes lanes 204 separated by lane markings 206. The lane markings 206 may be, for example, painted lines on the roadway. The lane markings 206 may be solid or dashed lines, single or double lines, white or yellow lines, etc. The lane markings 206 are used to line up and guide traffic, and to visually convey information to vehicle operators.

A vehicle 102 may use lane markings 206 in its ADAS to determine if the vehicle 102 is deviating from its driving lane 210 in certain situations. In particular, the vehicle 102 may use image data from a front-facing camera 122 to detect lane markings 206 and alert the vehicle operator that the vehicle 102 is approaching or crossing the lane marking of a driving lane 210. For example, the ADAS may use the HMI 112 to vibrate a steering wheel and/or display a message on a vehicle console when lane deviation is detected. Alternatively, the ADAS may use the detected lane markings 206 to actively provide a steering torque to assist the driver in directing the vehicle back toward the center of the driving lane 210 when lane deviation is detected.

The roadway 202 may include sections of the driving lane 210 where the lane markings 206 are visible. In these sections, the computer 104 can use image data from the forward-facing camera 122 to determine visible lane boundaries 212. As used herein, a visible lane boundary 212 is a section of the driving lane 210 where sufficient lane markings 206 are present for the computer 104 to determine a lane boundary based on extracted features of the lane markings in the image data. For example, a visible lane boundary 212 may include a left lane marker 214 and a right lane marker 216. The computer 104, using various image processing techniques, such as the Hough transform and edge detection, can extract left and right lane marker edges in the image data to determine a boundary of the driving lane section.

The computer 104 may use the visible lane boundary 212 to determine a driving path 208 for the vehicle 102. The driving path 208 may be, for example, a line equidistant between the left and right edges of the visible lane boundary 212. When the vehicle 102 deviates too far to the left or right of the driving path 208, the ADAS may alert the vehicle driver of lane deviation or actively provide a steering torque to assist the driver in directing the vehicle back toward the center of the driving path 208 in certain situations.

There may be sections of the driving lane 210 where there are insufficient lane marking 206 to determine visible lane boundary 212. For example, there may be a portion 218 of the driving lane 210 where lane markings 206 are missing or difficult to detect. Old or worn-out lane maker paint can lead to sparse data points for lane detections. The gaps may occur randomly and may not be predicted.

In addition, the lane markings 206 may be obscured a road covering 220, such as snow, water, mud, dust, etc., that can prevent the lane markings 206 from being detected. For example, light reflections due to water on the surface of the roadway 202 may cause an overexposed camera image. Such conditions are temporary and constantly changing while the vehicle 102 is in motion. The intensity of the light sources, angle of light hitting the reflective surface of the water, ambient light conditions, etc., are parameters which are variable and not predictable.

The computer 104 may determine a predicted lane boundary 222 of the driving lane 210. A predicted lane boundary 222 is defined herein as a section of the driving lane 210 where there are insufficient lane markings 206 present for the computer 104 to determine a lane boundary based on extracted features of the lane markings 206 in the image data. In one configuration, the computer may extract forward features in the forward image data that do not rely exclusively on lane markings 206 to determine predicted lane boundary 222 of the driving lane 210.

For example, the road covering 220 may include vehicle tracks 224 of other vehicles forward of the vehicle 102. The computer 104 may detect track edges of the vehicle tracks 224 in the forward image data to determine the predicted lane boundary 222 in certain situations. The computer 104 may detect tire edges of vehicle tires 226 in the forward image data to determine the predicted lane boundary 222 in certain situations. Additionally or alternatively, the computer 104 may detect taillight edges of vehicle taillights 228 in the forward image data to determine the predicted lane boundary 222 in certain situations. Furthermore, using data from sensors 108, the computer 104 may determine a lane width 230 of the driving lane 210. The computer 104 may use the detected lane width 230 to determine the predicted lane boundary 222. Moreover, any detected lane marking edges from the lane markings 206 in the forward image data may be used, in part, to determine the predicted lane boundary 222.

The vehicle's driving path 208 may pass through the predicted lane boundary 222. For example, the driving path 208 may be, for example, a line equidistant between the left and right edges of the predicted lane boundary 222. A location or locations, i.e., location coordinates, of a road feature, such as a visible lane boundary 212 or predicted lane boundary 222, can be specified by a mathematical function and/or a set of discrete points specified by a set of coordinates.

For example, a mathematical function describing a set of locations defined by a lane boundary could be $Y=a+bX+cX^2$, where X and Y represent longitudinal and lateral location coordinates with respect to a coordinate system. Thus, the foregoing function could describe a curvature, for example of a lane boundary on the roadway 204. Accordingly, the computer 104 may determine a driving path 208 of the vehicle 102 through both the visible lane boundaries 212 and the predicted lane boundary 222.

In one configuration, the computer 104 uses machine learning to determine and refine the location of predicted lane boundaries 222. A machine learning model can provide machine learning including prediction, filtering, machine learning processes, machine learning functions, or a combination thereof. For example, a suitable machine learning (ML) program such as a deep neural network (DNN) may be trained and then used to output, filter and/or predict a lane boundary. A DNN can be a software program that can be loaded in memory and executed by a processor included in a computer, such as a vehicle computer 104, for example. In an example implementation, the DNN can include, but is not limited to, a convolutional neural network (CNN), region-based CNN (R-CNN), Fast R-CNN, and Faster R-CNN. The DNN includes multiple nodes or neurons. The neurons are arranged so that the DNN includes an input layer, one or more hidden layers, and an output layer. The input and output layers may also include more than one node.

As one example, the DNN can be trained with ground truth data, i.e., data about a real-world condition or state. For example, the DNN can be trained with ground truth data and/or updated with additional data. Weights can be initialized by using a Gaussian distribution, for example, and a bias for each node can be set to zero. Training the DNN can include updating weights and biases via suitable techniques such as back-propagation with optimizations. Ground truth data means data deemed to represent a real-world environment, e.g., conditions and/or objects in the environment.

In the present context, ground truth data used to train a DNN could include, for example, track marks 224, vehicle tires 226, taillights 228, etc. Then, the DNN could be included in the vehicle 102 to output an indication of predicted lane boundaries 222. The vehicle memory may include instructions to train a machine learning model to determine the occurrence of predicted lane boundaries 222.

Figure 3:
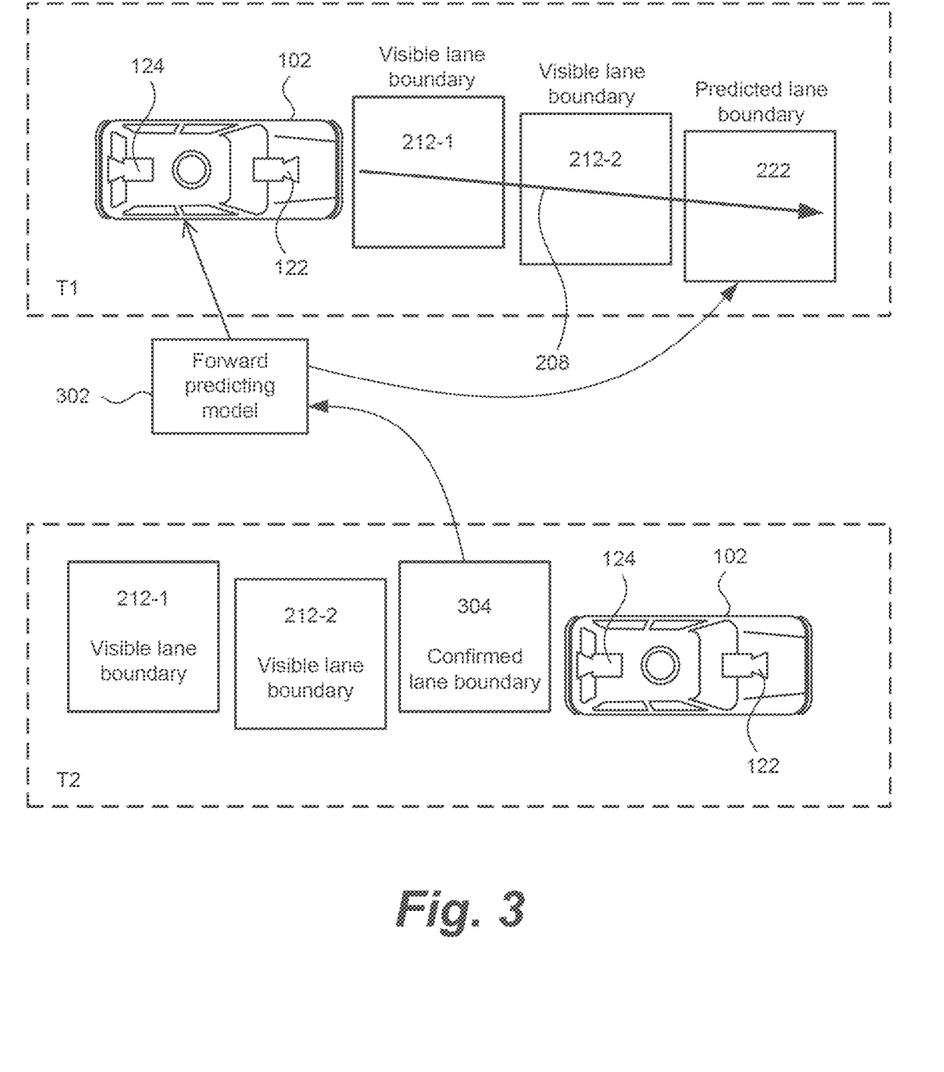
FIG. 3 shows an illustration of using a machine learning forward predicting model in a vehicle to determine a predicted lane boundary.

FIG. 3 shows an illustration of an example traffic scene using a ML forward predicting model 302 in the vehicle 102 to determine a predicted lane boundary 222. At a time T1, the forward predicting model 302 is used to determine a predicted lane boundary 222 located forward of the visible lane boundaries 212-1 and 212-2 on the roadway 202. As used herein, a forward predicting model 302 is a machine learning model that receives as input visible lane boundaries 212 and forward features from a forward-facing camera 122, such as track marks 224, vehicle tires 226, and taillights 228, and outputs a predicted lane boundary 222 located forward of the visible lane boundaries 212. The forward predicting model 302 is trained with confirmed lane boundaries 304 using rearward image data of the roadway from a rearward-facing camera 124 of the vehicle 102.

The forward predicting model 302 dynamically predicts unclear lane boundaries located forward of visible lane boundaries 212-1 (x,y,z), 212-2 (x,y,z), . . . 212n (x,y,z). The forward predicting model 302 uses visible lane boundaries 212-1 and 212-2, as well as forward features in the forward image data, to determine the predicted lane boundary 222. In one configuration, the forward predicting model 302 determines the predicted lane boundary 222 and extrapolates the driving path 208 through the predicted lane boundary 222.

At a later time T2, the vehicle 102 passes the predicted lane boundary 222 and may compare the location of confirmed lane boundary 304 against the predicted lane boundary 222 using received rearward image data of the roadway 202 from, for example, a rearward-facing camera 124 or a 360-degree imaging system of the vehicle 102. The computer 104 may determine a location accuracy of the predicted lane boundary 222 based on rearward features from, at least in part, the rearward image data and updates the forward predicting model 302 based on the location accuracy of the predicted lane boundary 222. Thus, the computer 104 continues updating the forward predicting model 302 based on location differences between the confirmed lane boundary 304 and the predicted lane boundary 222.

Figure 4:
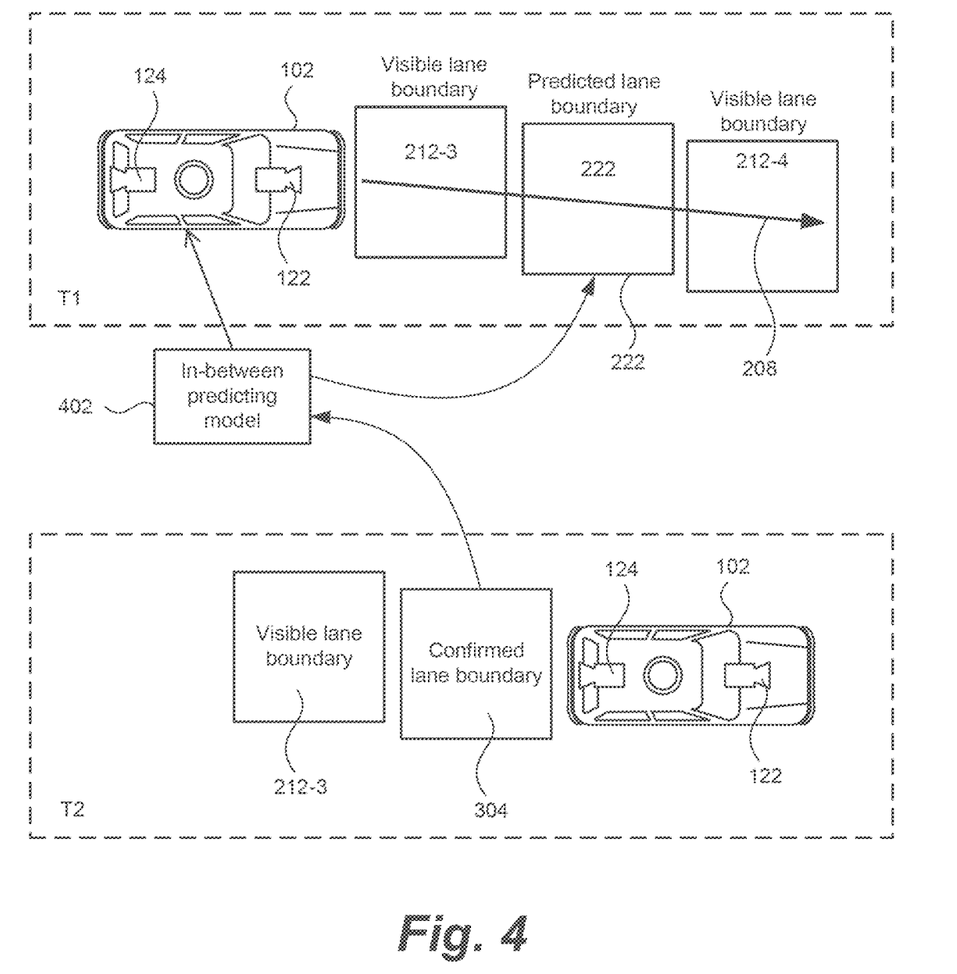
FIG. 4 shows an illustration of using a machine learning in-between predicting model in a vehicle to determine a predicted lane boundary.

FIG. 4 shows an illustration of an example traffic scene using a ML in-between predicting model 402 in the vehicle 102 to determine a predicted lane boundary 222. As used herein, an in-between predicting model 402 is a machine learning model that receives as input visible lane boundaries 212 and forward features from a forward-facing camera 122, such as track marks 224, vehicle tires 226, and taillights 228, and outputs a predicted lane boundary 222 located between the visible lane boundaries 212. The in-between predicting model 402 is trained with confirmed lane boundaries 304 using rearward image data of the roadway 202 from a rearward-facing camera 124 of the vehicle 102.

For example, at a time T1, the in-between predicting model 402 is used to determine a predicted lane boundary 222 located between visible lane boundaries 212-3 and 212-4 on the roadway 202. Like the forward predicting model 302, the in-between predicting model 402 may determine the predicted lane boundary 222 and extrapolate the driving path 208 through the predicted lane boundary 222.

At a later time T2, the vehicle 102 passes the predicted lane boundary 222 and may compare the location of confirmed lane boundary 304 against the predicted lane boundary 222 using received rearward image data of the roadway 202. The computer 104 may update the in-between predicting model 402 based on the location accuracy of the predicted lane boundary 222.

As mentioned above, the computer 104 may include computer memory storing instructions executable by a computer processor. The executable instructions may include instructions to cause the processor to receive forward image data of a roadway 202 from a forward-facing camera 122 of a vehicle. The roadway 202 includes a driving lane 210 for the vehicle 102 that may be demarcated by lane markings 206.

The instructions may cause the processor to determine visible lane boundaries 212 of the driving lane 210 based on lane marking features in the forward image data. As used herein, an image feature is a piece of information about the content of an image region, such as whether a certain region of the image has certain properties. For example, image features may be edges, corners or interest points, blobs or regions of interest points, and/or ridges. Extracted features of lane markings are defined herein as image features determined from localized computational operations applied to an image of lane markings 206 on a roadway 202.

A visible lane boundary 212 is a section of the driving lane 210 where sufficient lane markings 206 are present for the computer 104 to determine a boundary based on extracted features of the lane markings in the image data. The instructions may include instructions to receive LIDAR data from a LIDAR sensor 120 of the vehicle 102 and the visible lane boundaries 212 may be based on, at least in part, the LIDAR data.

In addition, the instructions may include instructions to determine a predicted lane boundary 222 of the driving lane 210 based, at least in part, on forward features in the forward image data. A predicted lane boundary 222 is a section of the driving lane 210 where there are insufficient lane markings 206 present for the computer 104 to determine a lane boundary based on extracted features of the lane markings 206 in the image data.

Various forward features in the forward image data may be used to determine the predicted lane boundary 222. For example, the instructions may include instructions to detect lane marking edges from the lane markings in the forward image data and the forward features may include the lane marking edges. In one configuration, the instructions may include instructions to detect track edges of vehicle tracks 224 in the forward image data and the forward features may include the track edges. In another implementation, the instructions include instructions to detect tire edges of vehicle tires 226 in the forward image data and the forward features may include the tire edges. In yet another implementation, the instructions may include instructions to detect taillight edges of vehicle taillights 228 in the forward image data and the forward features may include the taillight edges. The forward features may also include a lane width 230 of the driving lane 210.

In one configuration, the predicted lane boundary 222 may be located forward of the visible lane boundaries 212 on the roadway 202 and the instructions to determine the predicted lane boundary 222 include instructions to determine the predicted lane boundary 222 by a forward predicting model 302. In another configuration, the predicted lane boundary 222 may located between the visible lane boundaries 212 on the roadway 202 and the instructions to determine the predicted lane boundary 222 include instructions to determine the predicted lane boundary 222 by an in-between predicting model 402.

As discussed above, the instructions may include instructions for dynamic learning and updating lane predicting models. For example, the instructions may include instructions to receive rearward image data of the roadway from a rearward-facing camera 124 of the vehicle 102. The instructions may include determining a location accuracy of the predicted lane boundary based on rearward features from, at least in part, the rearward image data. The computer 104 may further be instructed to update the forward predicting model 302 and/or the in-between predicting model 402 based on the location accuracy of the predicted lane boundary 222.

The computer 104 may be further instructed to determine a driving path 208 of the vehicle 102 through the visible lane boundaries 212 and the predicted lane boundary 222. Upon determining the driving path 208, the instructions may include determining a lane deviation of the vehicle 102 and to provide an indication of lane deviation when the position of the vehicle in the roadway 202 departs from the driving path 208. Alternatively or additionally, the instructions may include instructions to actuate the vehicle 102 based on the driving path 208.

Figure 5A:
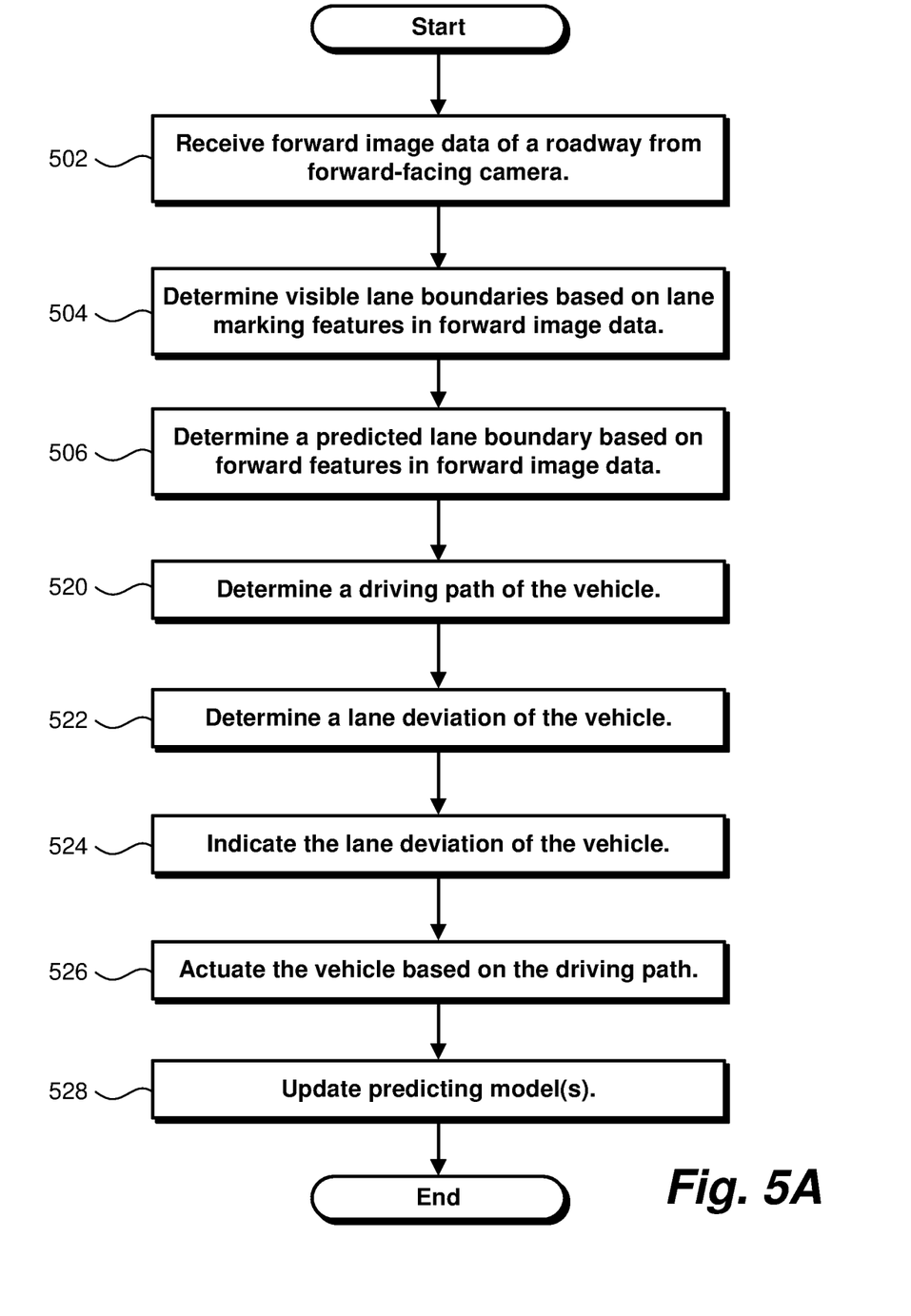
FIGS. 5A-5C show an example method for determining lane information.
Figure 5B:
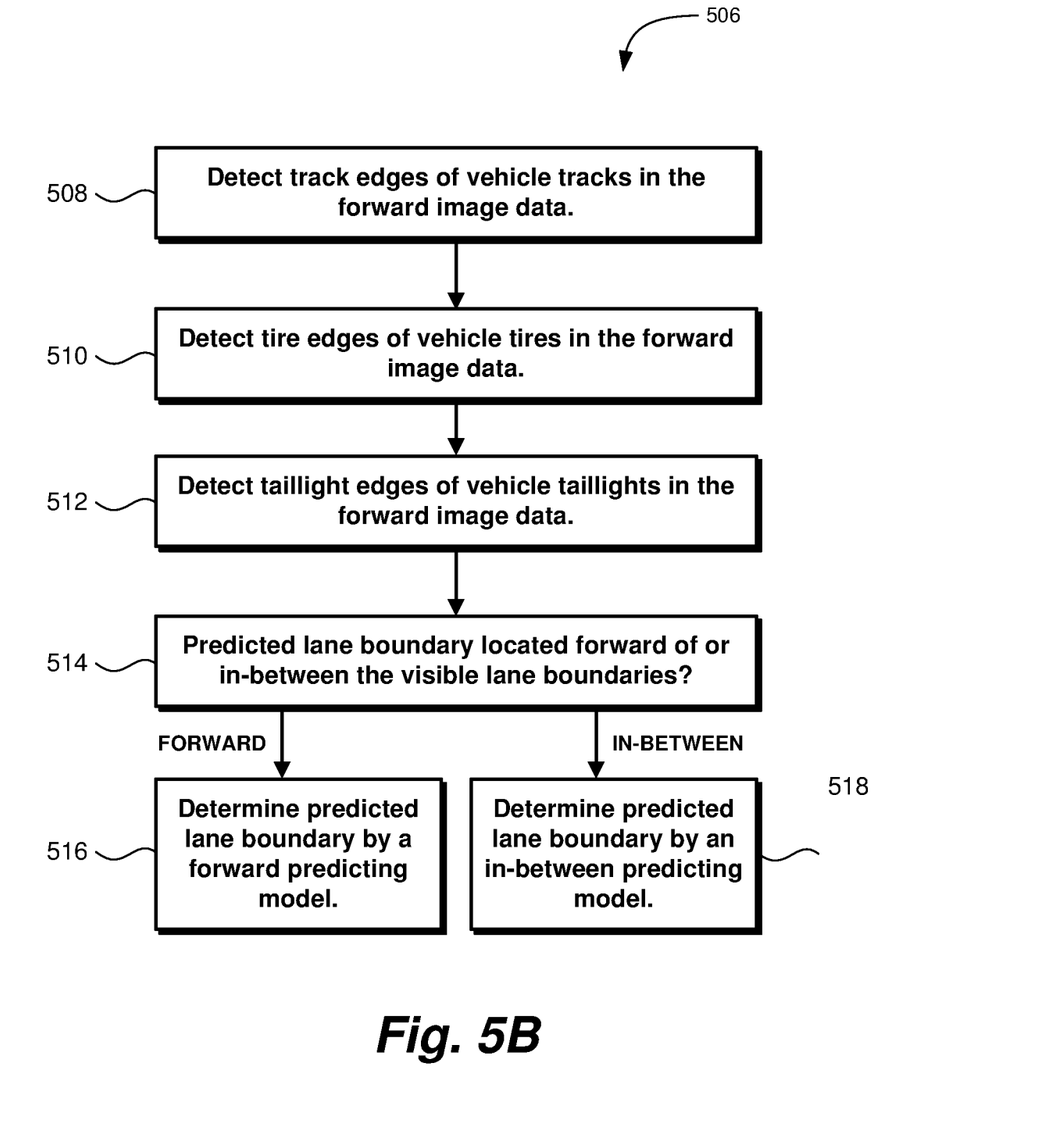

FIGS. 5A and 5B show an example method for determining a vehicle path. As mentioned, the computer 104 of the vehicle 102 may store executable instructions for performing the steps described below.

The method includes receiving operation 502 to receive forward image data of a roadway 202. The roadway 202 may designate a driving lane 210 for the vehicle 102 with lane markers 206. In one configuration, the forward image data may originate from a forward-facing camera 122 of a vehicle 102. It is contemplated that the forward image data may be received from other sensors, such as a LIDAR sensor 120 or a 360-degree imaging system. Thus, receiving operation 502 may include instructions to receive LIDAR data from a LIDAR sensor 120 of the vehicle 102. After receiving operation 502, control passes to determining operation 504.

At determining operation 504, visible lane boundaries 212 of the driving lane 210 are determined based on lane marking features in the forward image data. The forward image data can include sufficient lane marking features to determine the visible lane boundaries. In one configuration the visible lane boundaries are based on, at least in part, LIDAR data. After determining operation 504, control passes to determining operation 506.

At determining operation 506, a predicted lane boundary 222 of the driving lane 210 is determined based, at least in part, on forward features in the forward image data. The forward image data can include insufficient lane marking features to determine the predicted lane boundary 222. Determining operation 506 may include instructions for detecting various forward features that may be used to identify a predicted lane boundary 222. As mentioned above, the forward features may include a lane width 230 of the driving lane 210.

FIG. 5B shows several operations that may be performed during determining operation 506. For example, the forward features may include track edges, and determining operation 506 may include detecting operation 508 for detecting track edges of vehicle tracks 224 in the forward image data. The vehicle tracks 224 may be present due to a covering 220 on the roadway 202, such as snow, rain, mud, etc., that may cause lane markers 206 to be difficult to detect in the forward image data.

The forward features may include tire edges, and determining operation 506 may include detecting operation 510 for detecting tire edges of vehicle tires 226 in the forward image data. In another configuration, the forward features may include taillight edges, and determining operation 506 may include detecting operation 512 for detecting taillight edges of vehicle taillights 228 in the forward image data.

Determining operation 506 may include evaluating operation 514 to evaluate if the predicted lane boundary 222 is located forward of the visible lane boundaries 212, or if the predicted lane boundary 222 is located between the visible lane boundaries 212. If the predicted lane boundary 222 is evaluated to be located forward of the visible lane boundaries 212, control passes to determining operation 516.

At determining operation 516, a forward predicting model 302 is used to determine the predicted lane boundary 222. As discussed above, the forward predicting model 302 uses visible lane boundaries 212 located behind the predicted lane boundary 222, as well as forward features in the forward image data, to determine the predicted lane boundary 222.

If, at evaluating operation 514, the predicted lane boundary 222 is evaluated to be located between the visible lane boundaries 212, control passes to determining operation 518. At determining operation 518, an in-between predicting model is used to determine the predicted lane boundary 222. As discussed above, the in-between predicting model 402 uses visible lane boundaries 212 located behind and in front of the predicted lane boundary 222, as well as forward features in the forward image data, to determine the predicted lane boundary 222.

Returning to FIG. 5A, after determining operation 506, control passes to determining operation 520. At determining operation 520, a driving path 208 of the vehicle 102 through the visible lane boundaries 212 and the predicted lane boundary 222 is determined. The driving path 208 utilizes the discrete lane boundaries to provide a continuous path to predict a reasonable driving path 208 for the vehicle 102. After determining operation 520, control passes to determining operation 522.

At determining operation 522, a lane deviation of the vehicle 102 is determined. This operation may include, for example, calculating a distance of the vehicle 102 from the left and right edges of a visible lane boundary 212 and/or a predicted lane boundary 222. The lane deviation can be determined as an absolute value of the difference between the distance from left and right edges of the lane boundary. After determining operation 522, control passes to indicating operation 524.

At indicating operation 524, an indication of lane deviation is provided when the position of the vehicle 102 in the roadway 202 departs from the driving path 208. For example, when the vehicle's lane deviation exceeds a threshold deviation value, the HMI 112 may provide a lane deviation message to the vehicle operator. Indicating operation 524 may include other forms form of user feedback, such as vibrating a steering wheel. After indicating operation 524, control passes to actuating operation 526.

At actuating operation 526, the vehicle 102 may be actuated based on the driving path 208. This operation may include autonomously steering the vehicle 102 into the center of a visible lane boundary 212 and/or a predicted lane boundary 222. Actuating operation 526 other vehicle control, such as accelerating and braking with or without human interaction. After actuating operation 526, control passes to updating operation 528, where the predicting models used to determine predicted lane boundaries are updated based on rearward image data of the roadway 202.

Figure 5C:
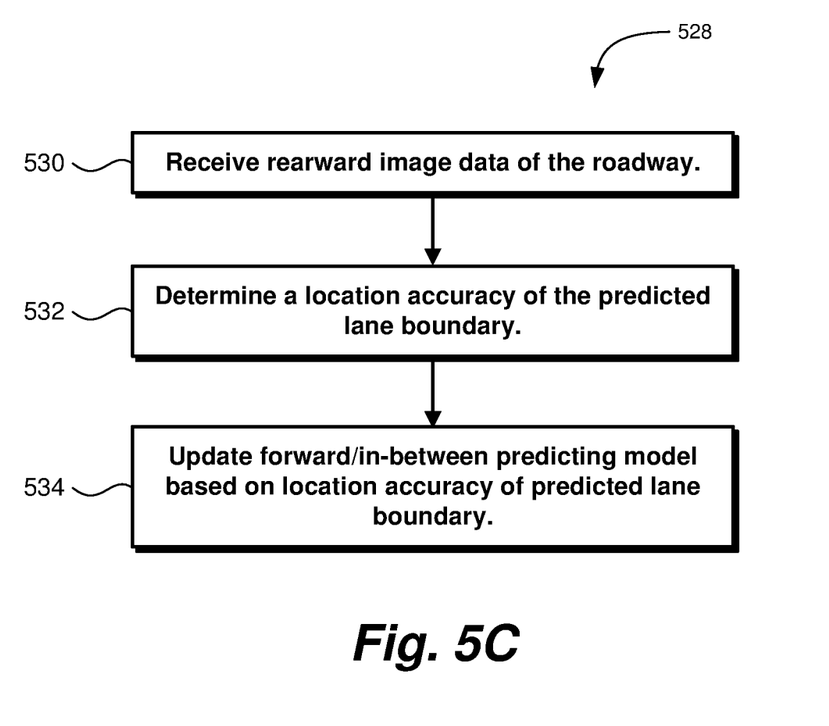

FIG. 5C shows example operations performed during the updating operation 528. At receiving operation 530, rearward image data of the roadway 202 are received. The rearward image data may come from, for example, a rearward-facing camera 124 or a 360-degree imaging system of the vehicle 102. After receiving operation 530, control passes to determining operation 532.

At determining operation 532, a location accuracy of the predicted lane boundary 222 is determined. The location accuracy of is predicted lane boundary 222 can be based on rearward features from, at least in part, the rearward image data. For example, the rearward features may be detected lane marker edges of lane markers 206 that were not earlier detected in the forward image data. After determining operation 532, control passes to updating operation 534.

At updating operation 534, the forward predicting model 302 or the in-between predicting model 402, depending on which model was used to generate the predicted lane boundary 222, is updated based on the location accuracy of the predicted lane boundary 222. Thus, the forward predicting model 302 and the in-between predicting model 402 are continuously updated based on location differences between the confirmed lane boundary 304 and the predicted lane boundary 222.

The descriptions of the various examples and implementations have been presented for purposes of illustration but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical enhancements over technologies found in the marketplace, or to enable others of ordinary skill in the art to understand the implementations disclosed herein.

As will be appreciated, the methods and systems described may be implemented as a computer program product. The computer program product may include a computer readable storage medium (or media) having computer readable program instructions thereon for causing a processor to carry out operations discussed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Various implementations are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
A processor and a memory, the memory storing instructions executable by the processor, including instructions to:
Receive forward image data of a roadway from a forward-facing camera of a vehicle, the roadway including a driving lane for the vehicle;
Determine visible lane boundaries of the driving lane based on lane marking features in the forward image data, the forward image data including sufficient lane marking features to determine the visible lane boundaries, wherein a predicted lane boundary is located between the visible lane boundaries on the roadway;
Determine the predicted lane boundary of the driving lane by an in-between predicting model based, at least in part, on forward features in the forward image data, the forward image data including insufficient lane marking features to determine the predicted lane boundary;
Determine a driving path of the vehicle through the visible lane boundaries and the predicted lane boundary; and
Actuate the vehicle based on the driving path.

2. The system of claim 1, wherein the instructions include instructions to:
receive rearward image data of the roadway;
determine a location accuracy of the predicted lane boundary, the location accuracy based on rearward features from, at least in part, the rearward image data; and
update the in-between predicting model based on the location accuracy of the predicted lane boundary.

3. The system of claim 1,
wherein the instructions include instructions to detect lane marking edges from lane markings in the forward image data; and
wherein the forward features include the lane marking edges.

4. The system of claim 1,
wherein the instructions include instructions to detect track edges of vehicle tracks in the forward image data; and
wherein the forward features include the track edges.

5. The system of claim 1,
wherein the instructions include instructions to detect tire edges of vehicle tires in the forward image data; and
wherein the forward features include the tire edges.

6. The system of claim 1,
wherein the instructions include instructions to detect taillight edges of vehicle taillights in the forward image data; and
wherein the forward features include the taillight edges.

7. The system of claim 1, wherein the forward features include a lane width of the driving lane.

8. The system of claim 1, further comprising:
instructions to receive LIDAR data from a LIDAR sensor of the vehicle;
wherein the visible lane boundaries are based on, at least in part, the LIDAR data.

9. The system of claim 1, wherein the instructions include instructions to:
determine a lane deviation of the vehicle when a position of the vehicle in the roadway departs from the driving path; and
provide an indication of lane deviation when the position of the vehicle in the roadway departs from the driving path.

10. A method comprising:
Receiving forward image data of a roadway from a forward-facing camera of a vehicle, the roadway including a driving lane for vehicle;
Determining visible lane boundaries of the driving lane based on lane marking features in the forward image data, the forward image data including sufficient lane marking features to determine the visible lane boundaries, wherein a predicted lane boundary is located between the visible lane boundaries on the roadway;
Determining the predicted lane boundary of the driving lane by an in-between predicting model based, at least in part, on forward features in the forward image data, the forward image data including insufficient lane marking features to determine the predicted lane boundary;
Determining a driving path of the vehicle through the visible lane boundaries and the predicted lane boundary; and
Actuating the vehicle based on the driving path.

11. The method of claim 10, further comprising: receiving rearward image data of the roadway;
determining a location accuracy of the predicted lane boundary, the location accuracy based on rearward features from, at least in part, the rearward image data;
and updating the in-between predicting model based on the location accuracy of the predicted lane boundary.

12. The method of claim 10, further comprising:
detecting lane marking edges, vehicle track edges, vehicle tail light edges, or vehicle tire edges in the forward image data; and
wherein the forward features include the lane marking edges, vehicle track edges, vehicle tail light edges, or vehicle tire edges.

13. The method of claim 10, wherein the forward features include a lane width of the driving lane.

14. The method of claim 10, further comprising:
receiving LIDAR data from a LIDAR sensor of the vehicle;
wherein the visible lane boundaries are based on, at least in part, the LIDAR data.

15. The method of claim 10, further comprising: determining a lane deviation of the vehicle when a position of the vehicle in the roadway departs from the driving path;
and providing an indication of lane deviation when the position of the vehicle in the roadway departs from the driving path.

16. A system comprising:
a processor and a memory, the memory storing instructions executable by the processor, including instructions to:
receive forward image data of a roadway from a forward-facing camera of a vehicle, the roadway including a driving lane for the vehicle;

receive rearward image data of the roadway;

determine visible lane boundaries of the driving lane based on lane marking features in the forward image data, the forward image data including sufficient lane marking features to determine the visible lane boundaries;

determine a predicted lane boundary of the driving lane by a forward predicting model based, at least in part, on forward features in the forward image data, the forward image data including insufficient lane marking features to determine the predicted lane boundary, wherein the predicted lane boundary is located forward of the visible lane boundaries on the roadway;

determine a location accuracy of the predicted lane boundary, the location accuracy based on rearward features from, at least in part, the rearward image data;

update the forward predicting model based on the location accuracy of the predicted lane boundary;

determine a driving path of the vehicle through the visible lane boundaries and the predicted lane boundary; and actuate the vehicle based on the driving path.

17. The system of claim 16:
wherein the instructions include instructions to detect lane marking edges, vehicle track edges, vehicle tail light edges, or vehicle tire edges in the forward image data; and wherein the forward features include the lane marking edges, vehicle track edges, vehicle tail light edges, or vehicle tire edges.

18. The system of claim 16, wherein the forward features include a lane width of the driving lane.

19. The system of claim 16, further comprising:
instructions to receive LIDAR data from a LIDAR sensor of the vehicle;

wherein the visible lane boundaries are based on, at least in part, the LIDAR data.

20. The system of claim 16, wherein the instructions include instructions to:
determine a lane deviation of the vehicle when a position of the vehicle in the roadway departs from the driving path; and provide an indication of lane deviation when the position of the vehicle in the roadway departs from the driving path.

\* \* \* \* \*

UNITED STATES PATENT AND TRADEMARK OFFICE
CERTIFICATE OF CORRECTION

PATENT NO. : 12,283,114 B2
APPLICATION NO. : 18/147031
DATED : April 22, 2025
INVENTOR(S) : Christian Wegner et al.

Page 1 of 1

It is certified that error appears in the above-identified patent and that said Letters Patent is hereby corrected as shown below:

In the Claims

| | |
|---|---|
| Column 15, Line 16, Claim 1: | Replace "A" with --a--; |
| Column 15, Line 19, Claim 1: | Replace "Receive" with --receive--; |
| Column 15, Line 22, Claim 1: | Replace "Determine" with --determine--; |
| Column 15, Line 28, Claim 1: | Replace "Determine" with --determine--; |
| Column 15, Line 33, Claim 1: | Replace "Determine" with --determine--; |
| Column 15, Line 36, Claim 1: | Replace "Actuate" with --actuate--; |
| Column 16, Line 15, Claim 10: | Replace "Receiving" with --receiving--; |
| Column 16, Line 18, Claim 10: | Replace "Determining" with --determining--; |
| Column 16, Line 24, Claim 10: | Replace "Determining" with --determining--; |
| Column 16, Line 30, Claim 10: | Replace "Determining" with --determining--; and |
| Column 16, Line 33, Claim 10: | Replace "Actuating" with --actuating--. |

Signed and Sealed this
Twentieth Day of May, 2025

Coke Morgan Stewart
*Acting Director of the United States Patent and Trademark Office*